United States Patent
Lo

(10) Patent No.: US 10,117,302 B1
(45) Date of Patent: Oct. 30, 2018

(54) ELECTRONIC DRIVER WITH ELECTRIC-LEAKAGE PROTECTION FOR LED LIGHTING

(71) Applicant: AMPCO PRODUCTS LTD., Hong Kong (HK)

(72) Inventor: Chun Tung Lo, Hong Kong (HK)

(73) Assignee: AMPCO PRODUCTS LTD., Hong Kong (HK)

( * ) Notice: Subject to any disclaimer, the term of this patent is extended or adjusted under 35 U.S.C. 154(b) by 0 days.

(21) Appl. No.: 15/881,839

(22) Filed: Jan. 29, 2018

(30) Foreign Application Priority Data

Sep. 5, 2017 (CN) .......................... 2017 1 0792271

(51) Int. Cl.
  *H05B 33/08* (2006.01)
  *H02M 3/155* (2006.01)
(52) U.S. Cl.
  CPC ..... *H05B 33/0887* (2013.01); *H05B 33/0815* (2013.01); *H02M 3/155* (2013.01)
(58) Field of Classification Search
  CPC ........... H05B 33/0887; H05B 33/0815; H02M 3/155
  See application file for complete search history.

(56) References Cited

U.S. PATENT DOCUMENTS

2017/0311397 A1* 10/2017 Hsia ........................ F21V 25/10

* cited by examiner

*Primary Examiner* — Tung X Le
*Assistant Examiner* — Henry Luong
(74) *Attorney, Agent, or Firm* — Spruson & Ferguson (Hong Kong) Limited

(57) ABSTRACT

In a LED driver with electric-leakage protection, a series cascade of a current sensor and a solid-state switch connects a converter circuit to a unipolar voltage source powered by an external voltage source connected to the driver through two electrical contacts. The current sensor measures a return current returned from the converter circuit to the unipolar voltage source. The switch isolates the unipolar voltage source from the converter circuit for electric-shock prevention when the external source is determined not connected to both contacts. To determine it, the switch is switched on for a test duration to drive the converter circuit. This duration is not greater than a maximum test duration predetermined to avoid a person absorbing an energy greater than a predefined human-tolerable shock energy when the person accidentally touches one of the contacts. Whether the external source is connected to both contacts is determined according to the return current.

17 Claims, 4 Drawing Sheets

ELECTRONIC DRIVER WITH ELECTRIC-LEAKAGE PROTECTION FOR LED LIGHTING

CROSS-REFERENCE TO RELATED APPLICATION

This application claims priority to Chinese Patent Application No. 201710792271.9, filed on Sep. 5, 2017, the disclosure of which is incorporated by reference herein in its entirety.

FIELD OF THE INVENTION

The present invention generally relates to an electronic driver for driving a light emitting diode (LED) load. In particular, the present invention relates to such electronic driver with protection against electric leakage for reducing risk of electric shock to a person.

BACKGROUND

In LED lighting, an electronic driver or a LED driver in short converts an AC voltage provided from an AC mains to a DC output current for driving a LED load such as a retrofit LED tube. The conversion is done by first rectifying the AC voltage to a DC voltage and then using a DC-to-DC switching-mode power converter to generate the DC output current. In the electronic driver, an isolation transformer is sometimes not installed between the AC mains and output ports of the power converter for cost saving. In the absence of the isolation transformer, there is a risk that a person receives an electric shock.

In particular, the risk is suspected to be increased after the introduction of retrofit LED tubes for replacing conventional fluorescent tubes. For illustrating this risk, FIG. 1 depicts a typical situation that a person 80 inserts a retrofit LED tube 10 to a lamp holder 20 for receiving electrical power from an AC mains 30. Typically, the LED tube 10 integrates a LED load and an electronic driver so that an external driver (or a ballast) is not required. As a result, the AC mains 30 may be connected directly to two ends of the lamp holder 20. When the person 80 inserts the LED tube 10 into the lamp holder 20, one end 11 of the LED tube 10 is inserted into the lamp holder 20 while it is possible that the person 80 holds another end 12 of the LED tube 10. Different from a fluorescent tube, whose two ends are separated by a gas that typically forms an insulator unless ionization occurs, the LED tube 10 contains electronics and there may be a circuit path between the two ends 11, 12, posing a risk of electric shock to the person 80.

In the art, most of the effort on electric-leakage protection for the electronic driver has been focused on overcurrent protection, e.g., US2012/0086356 and US2016/0120002, rather than prevention of electric shock to the personnel. There is a need in the art to have an electronic driver that drives a LED load and at the same time provides electric-shock protection to a person when the person inserts a LED lamp integrated with the electronic driver and the LED load to an AC mains.

SUMMARY OF THE INVENTION

An aspect of the present invention is to provide an electronic driver for driving a LED load and providing electric-leakage protection to prevent electric shock received by a person.

The electronic driver comprises a converter circuit for converting electrical power provided by a unipolar voltage source to an output current used for driving the LED load. The converter circuit includes a local ground node for collecting the output current and an operating current drawn by the converter circuit to form a return current to be returned to the unipolar voltage source. The unipolar voltage source has a source-side ground node for receiving at least the return current.

The electronic driver further comprises two electrical contacts collectively for electrically connecting to an external voltage source and receiving electrical power therefrom. The received electrical power is used for powering the unipolar power source.

Particularly, the electronic driver further comprises a series cascade of a current sensor and a solid-state switch. The series cascade connects the source-side ground node and the local ground node such that the current sensor is used for measuring the return current.

In addition, the electronic driver further comprises an electronic controller configured to execute a control process for controlling the solid-state switch to switch on and off. The control process comprises a test subprocess for testing whether the external voltage source is electrically connected to both the electrical contacts.

The test subprocess comprises switching on the solid-state switch for a test duration so as to drive the converter circuit to operate during the test duration. The test duration is selected to be not greater than a maximum test duration predetermined for avoiding a person to absorb from the external voltage source an energy greater than a pre-defined human-tolerable shock energy under a condition that the external voltage source is electrically connected to only one of the electrical contacts and the person accidentally touches another one of the electrical contacts. The test subprocess further comprises: obtaining, from the current sensor, a measured value of the return current observed during the test duration; and determining whether the external voltage source is electrically connected to both the electrical contacts according to the measured return-current value.

The control process further includes the following procedure. When it is determined that the external voltage source is electrically connected to both the electrical contacts, the solid-state switch is switched on so as to drive the LED load. When it is determined that the external voltage source is not electrically connected to both the electrical contacts, the solid-state switch is switched off for an idle period so as to isolate the converter circuit from the unipolar voltage source, and then the test subprocess is repeated. The idle period is selected such that an energy absorbed by the converter circuit during the test period is substantially dissipated during the idle period.

Preferably, the determining of whether the external voltage source is electrically connected to both the electrical contacts comprises the following procedure. When the measured return-current value has a magnitude greater than a predetermined current value, it is determined that the external voltage source is electrically connected to both the electrical contacts. When the magnitude is less than the predetermined current value, it is determined that the external voltage source is not electrically connected to both the electrical contacts.

The solid-state switch may be implemented by including a MOSFET. The current sensor may also be implemented by including a resistor, whereby a voltage developed across the resistor is the measured return-current value obtained by the electronic controller.

The maximum test duration may be 50 μs. The idle period may be selected to be not less than 10 ms. In one embodiment, the predetermined frequency value is selected to be 120 Hz.

According to one embodiment, the electronic driver further comprises a rectifier for rectifying an AC voltage provided by the external voltage source to yield the unipolar power source. The electronic driver may further comprise a frequency-measurement circuit connected to a plurality of input terminals of the rectifier for measuring a frequency of the AC voltage. In the presence of the frequency-measurement circuit, the control process further includes: obtaining, from the frequency-measurement circuit, a measured frequency value; when the measured frequency value is greater than a predetermined frequency value, switching on the solid-state switch to drive the LED load without a need to execute the test subprocess; and when the measured frequency value is not greater than the predetermined frequency value, initiating the test subprocess.

A LED lamp device is realizable by including a LED load and any of the embodiments of the electronic driver as disclosed herein, wherein the predetermined current value is determined such that when the LED lamp device is tested for a possible risk of electric shock according to UL 1993, the LED lamp produces a meter reading defined in UL 935 to be not greater than 5 meter indicating units (M.I.U.).

Other aspects of the present invention are disclosed as illustrated by the embodiments hereinafter.

DETAILED DESCRIPTION

The present invention provides an electronic driver for driving a LED load. Examples of the LED load include one or more strings of LEDs, a retrofit LED tube, an outdoor LED signpost, and an LED array used in street lighting.

Figure 1:
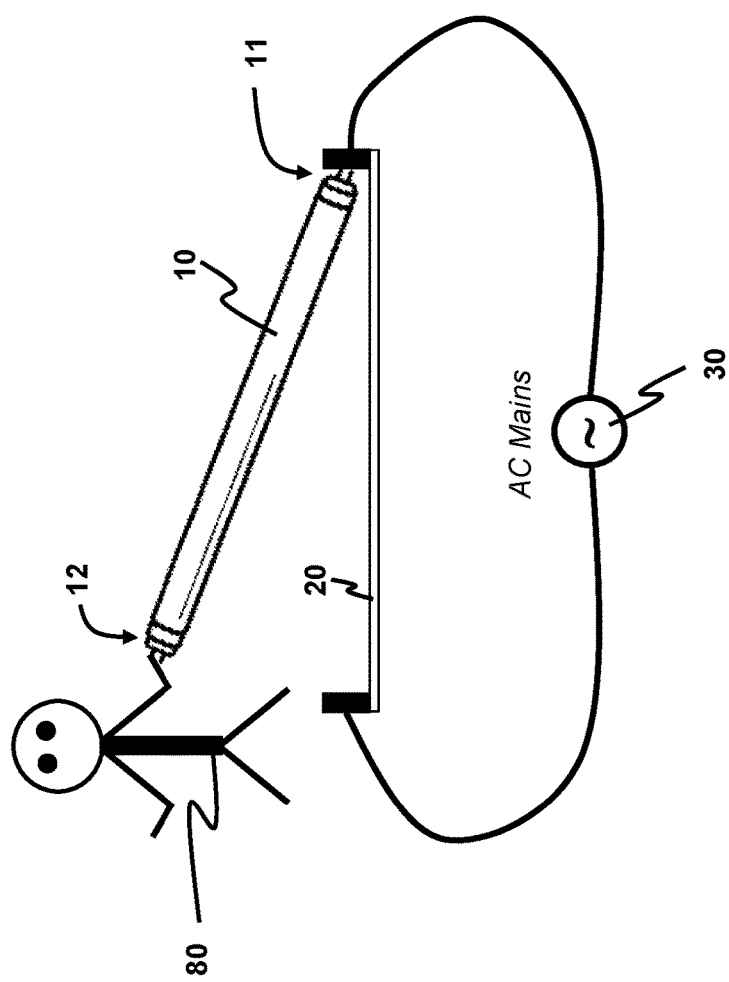
FIG. 1 depicts an example situation illustrating a potential risk of getting an electric shock when a user inserts a retrofit LED tube into a lamp holder.
Figure 2:
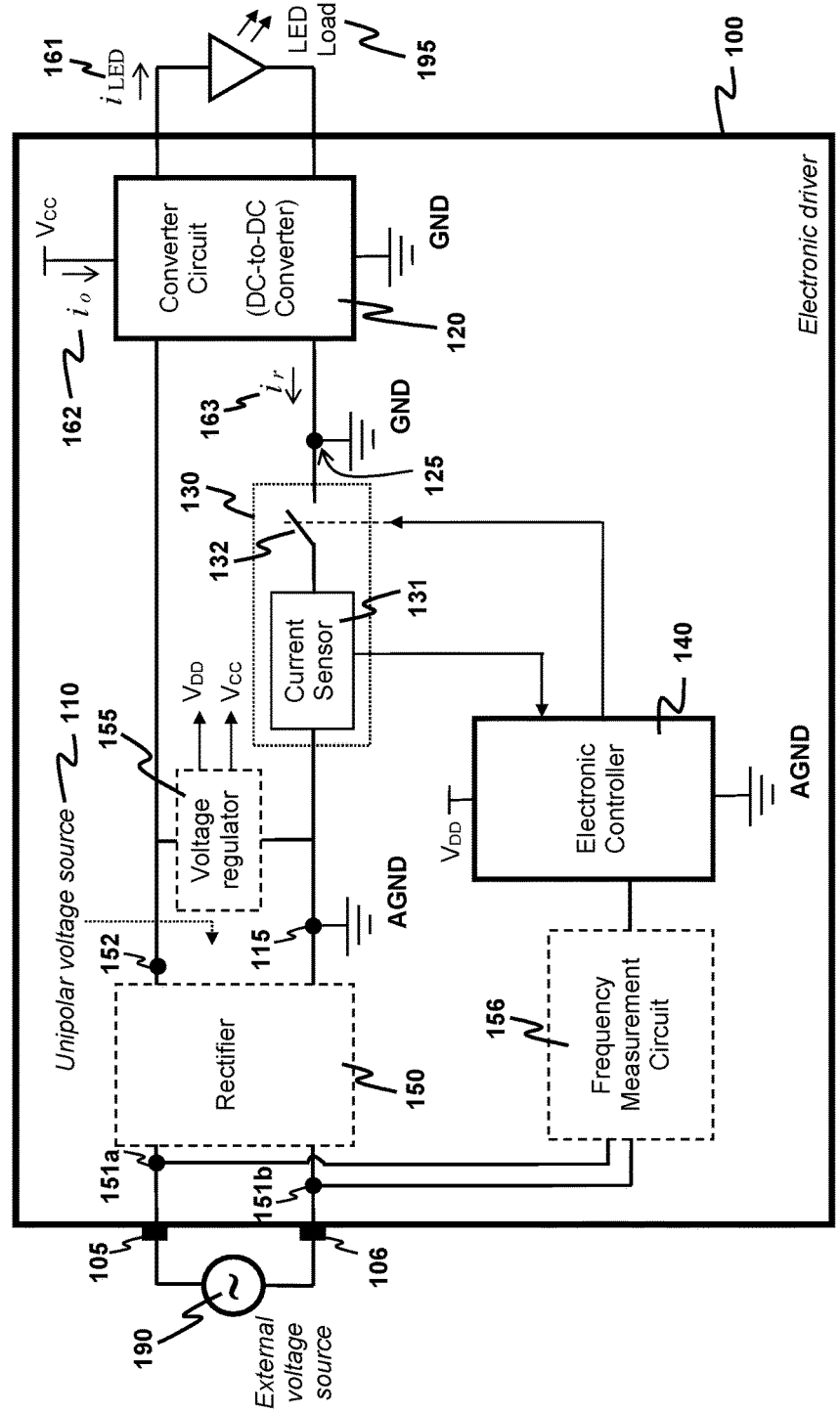
FIG. 2 depicts a block-diagram schematic of an electronic driver in accordance with an exemplary embodiment of the present invention.
Figure 4:
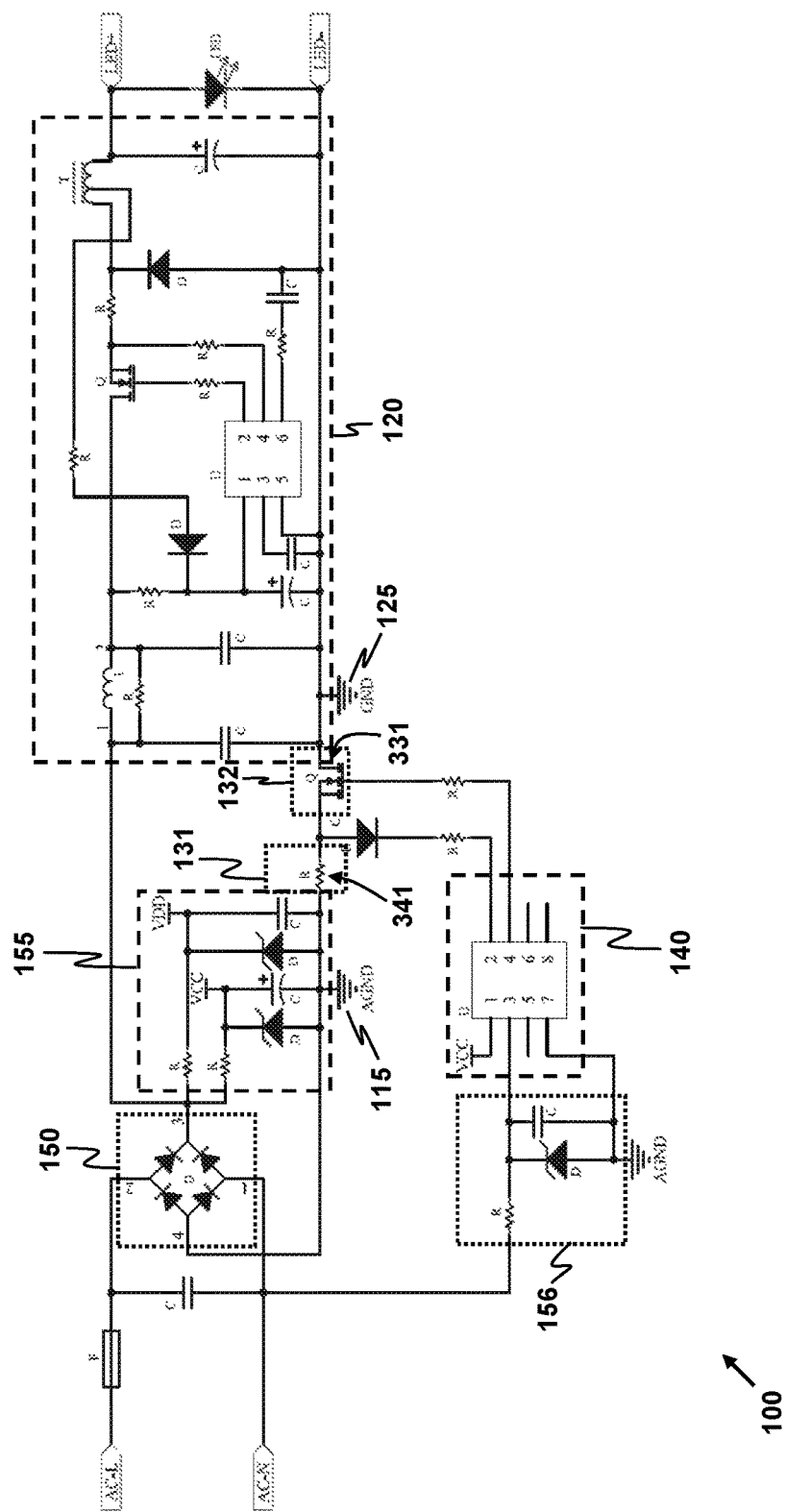
FIG. 4 depicts one circuit realization of the electronic driver based on the schematic of FIG. 2.

The present invention is illustrated with the aid of FIGS. 2 and 4. FIG. 2 depicts an exemplary block-diagram schematic of the electronic driver as disclosed herein, and FIG. 4 depicts one circuit realization of the electronic driver based on the schematic of FIG. 2.

Refer to FIG. 2. An electronic driver 100 is electrically connected to an external voltage source 190 through two electrical contacts 105, 106, and receives electrical power from the external voltage source 190. The electrical contacts 105, 106 are usually metallic contacts, or collectively form a socket or an inlet of the electronic driver 100. For a retrofit LED tube, the electrical contacts 105, 106 are usually wired to metallic pins protruded from the retrofit LED tube and used for connecting to the external voltage source 190. Generally, the external voltage source 190 is provided by an AC mains having a root-mean-square (rms) voltage that depends on a country in which the electronic driver 100 is used, and on whether single-phase or three-phase power is used. The rms voltage, typically ranging from 120V to 400V, is high enough to cause an accident of electric shock to a person. The AC voltage provided by the external voltage source 190 is rectified by a rectifier 150 to give a DC voltage across output terminals 152, 115 of the rectifier 150. Preferably, the rectifier 150 is a full-wave rectifier as shown in FIG. 4. Logically, the DC voltage across the output terminals 152, 115 creates a unipolar voltage source 110.

In the present invention, it is intended that the electronic driver 100 operates on the unipolar voltage source 110 as a starting point. Although it is preferable that the unipolar voltage source 110 is provided from rectifying an AC voltage provided by the external voltage source 190, the present invention is not limited only to this approach of providing the unipolar voltage source 110. The external voltage source 190 may directly provide a DC voltage to form the unipolar voltage source 110.

For simplicity, the reference numerals 152 and 115 are reused in describing the unipolar voltage source 110. The unipolar voltage source 110 has a voltage-supplying node 152 and a source-side ground node 115 (denoted as AGND in FIGS. 2 and 4). The unipolar voltage source 110 provides the DC voltage measured at the voltage-supplying node 152 with reference to a ground potential at the source-side ground node 115. Although the DC voltage is usually positive in most realizations of the electronic driver 100, the present invention is not limited to this case. The DC voltage may be negative.

The electronic driver 100 comprises a converter circuit 120 for converting electrical power provided by the unipolar voltage source 110 to an output current 161, $i_{LED}$, used for driving a LED load 195. The converter circuit 120 is a DC-to-DC switching-mode power converter. Those skilled in art will appreciate that the DC-to-DC switching-mode power converter may be designed based on the technical knowledge in the art, e.g., Wens M., and Steyaert M. (2011), "Basic DC-DC Converter Theory," in *Design and Implementation of Fully-Integrated Inductive DC-DC Converters in Standard CMOS*, Springer, Dordrecht. When the converter circuit 120 is operating, there is an operating current 162, $i_o$, drawn by the converter circuit 120. The converter circuit 120 includes a local ground node 125 (denoted as GND in FIGS. 2 and 4) for collecting the output current 161 and the operating current 162 to form a return current 163, $i_r$, to be returned to the unipolar voltage source 110. Note that $i_o + i_{LED} = i_r$. The source-side ground node 115 receives at least the return current 163. Furthermore, the source-side ground node 115 is separated from the local ground node 125. In the foregoing elaboration on the current-flow directions of the output current 161, the operating current 162 and the return current 163 with respect to the local ground node 125 and the source-side ground node 115, a positive DC voltage provided by the unipolar voltage source 110 is assumed. In case a negative DC voltage is used, $i_{LED}$ 161, $i_o$ 162 and $i_r$ 163 take negative values and the current-flow directions are reversed.

The electronic driver 100 further comprises a series cascade 130 of a current sensor 131 and a solid-state switch 132. The series cascade 130 connects the source-side ground node 115 and the local ground node 125. The current sensor 131 is used for measuring the return current 163. An electronic controller 140 is used in the electronic driver 100 for controlling the solid-state switch 132 to switch on and off according to the return current 163 measured by the current sensor 131. Switching on and off the solid-state switch 132 enables controlling the converter circuit 120 to operate or to be idle. In addition, switching off the solid-state switch 132 provides isolation between the two electrical contacts 105, 106, thus reducing a potential risk of electric shock to occur to a person when the person inserts a LED lamp that integrates the electronic driver 100 and the LED load 195 to the external voltage source 190.

Figure 3:
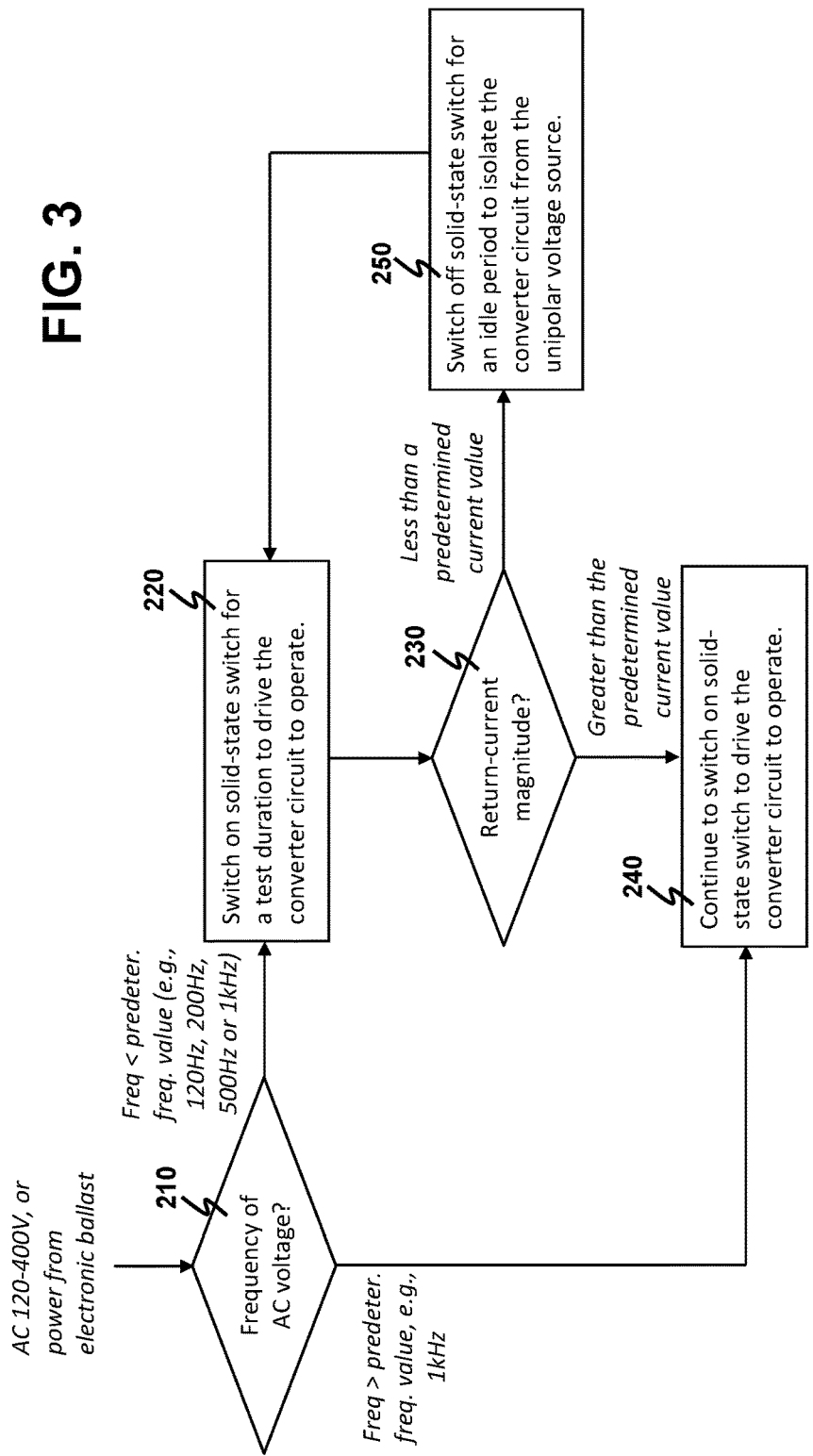
FIG. 3 depicts an exemplary flowchart of a control process for controlling a solid-state switch of the electronic driver, where the solid-state switch controls whether a converter circuit for driving a LED load operates or not and whether the converter circuit is isolated from a unipolar voltage source for electric-shock prevention.

Exemplarily, the electronic controller 140 comprises one or more computing processors configured to execute a control process for controlling the solid-state switch 132 to switch on and off. The control process is illustrated with the aid of FIG. 3, which depicts an exemplary flowchart of the control process.

The control process comprises a test subprocess for testing whether the external voltage source 190 is electrically connected to both the electrical contacts 105, 106.

In the test subprocess, the solid-state switch 132 is switched on from an off state for a test duration (step 220). As a result, the converter circuit 120 is driven to operate during the test period. The test duration is selected to be not greater than a maximum test duration. This maximum test duration is determined so as to avoid a person to absorb, from the external voltage source 190, an energy greater than a pre-defined human-tolerable shock energy under a condition that the external voltage source 190 is electrically connected to only one of the two electrical contacts 105, 106 and the person accidentally touches another one of the electrical contacts 105, 106. The human-tolerable shock energy has been thoroughly investigated in the art. Figures of the human-tolerable shock energy are listed in, e.g., "IEEE Guide for Safety in AC Substation Grounding," IEEE Std 80-2000. Let $S_B$ be the human-tolerable shock energy and R be the resistance of the person. As used in IEEE Std 80-2000, a resistance value of 1000Ω may be assumed although R may range from 500Ω to 3000Ω. Let V be a rms voltage of an AC voltage of the external voltage source 190. The maximum test duration, $t_{test,max}$, is computed according to $V^2/R \times t_{test,max} = S_B$. In one embodiment, $t_{test,max} = 50$ μs.

The test subprocess further comprises obtaining, from the current sensor 131, a measured value of the return current 163 observed during the test duration. The magnitude (i.e. the absolute value) of the measured return-current value is compared with a predetermined current value (step 230). This predetermined current value is a threshold below which the external voltage source 190 is predicted to be not electrically connected to both the electrical contacts 105, 106. When the magnitude is greater than a predetermined current value, the test subprocess determines that the external voltage source 190 is electrically connected to both the electrical contacts 105, 106. When the magnitude is less than the predetermined current value, the test subprocess determines that the external voltage source 190 is not electrically connected to both the electrical contacts 105, 106.

Different approaches may be used to determine the predetermined current value.

As stated in *Standard for Light-Emitting Diode (LED) Retrofit Luminaire Conversion Kits*, UL 1598C, LED lamps included in the retrofit kit and retrofit LED tubes intended to substitute fluorescent lamps are required to comply with the *Standard for Self-Ballasted Lamps and Lamp Adapters*, UL 1993. In UL 1993, it is demanded that a LED lamp device substituting for a linear fluorescent lamp is evaluated for a possible risk of electric shock under conditions of installing, removing, or replacing the LED lamp device. Furthermore, UL 1993 stipulates that a shock hazard measurement meter circuit as detailed in UL 935 is used for testing the LED lamp device for a possible risk of electric shock. UL 935, namely *Standard for Fluorescent-Lamp Ballasts*, also provides a measurement procedure with a body impedance model and a frequency-selective network for measuring an electric shock current. When the LED lamp device is tested with the measurement procedure of UL 935, UL 1993 stipulates that a current measured by a meter defined in UL 935 (where the current is called as a meter reading in UL 935) shall not exceed 5 meter indicating units (M.I.U.), or 7.07 peak M.I.U. In one approach of setting the predetermined current value, this value is determined such that a LED lamp device housing the electronic driver 100 satisfies the requirement of achieving not greater than 5 M.I.U. or equivalently, not greater than 7.07 peak M.I.U.

In a similar approach, when a statistical model of $i_r$ 163 is obtained, for instance, by an empirical procedure, the predetermined current value is determined such that a probability of falsely determining the meter reading to be less than 7.07 M.I.U. is below a negligible level of risk, e.g., 0.0001%. Those skilled in the art will appreciate that the predetermined current value may be determined by conventional statistical techniques.

In yet another approach, the predetermined current value is determined as the one that minimizes a probability of miss under a constraint that a probability of false alarm is maintained as a certain value. The probability of miss is a conditional probability that the external voltage source 190 is determined to be electrically connected to both of the electrical contacts 105, 106 under a condition that the external voltage source 190 is actually connected to only one of the electrical contacts 105, 106. The probability of false alarm is a conditional probability that the external voltage source 190 is determined to be not electrically connected to both of the electrical contacts 105, 106 under a condition that the external voltage source 190 is actually connected to both of the electrical contacts 105, 106. Those skilled in the art will appreciate that such determination of the predetermined current value is a classical Neyman-Pearson detection problem. Solutions to the Neyman-Pearson problem are available in the art, e.g., *An Introduction to Signal Detection and Estimation*, authored by H. V. Poor, published by Springer, 1994.

After the test result of the test subprocess is obtained, the control process determines an action to be taken by the electronic controller 140 according to the test result as follows.

When the test subprocess determines that the external voltage source 190 is electrically connected to both the electrical contacts 105, 106, the solid-state switch 132 continues to be switched on (step 240) so as to drive the LED load 195.

When the test subprocess determines that the external voltage source 190 is not electrically connected both to the electrical contacts 105, 106, the solid-state switch 132 is switched off for an idle period (step 250) so as to isolate the converter circuit 120 from the unipolar voltage source 110 over the idle period. This isolation substantially lowers the risk of the person from getting an electric shock. After the idle period expires, the test subprocess is repeated (through performing the step 220 again) to retest whether the LED load 195 is electrically connected to the converter circuit 120. The idle period is selected such that an energy absorbed by the converter circuit 120 during the test period is substantially dissipated during the idle period. In one embodiment, the idle period is selected to be not less than 10 ms.

Optionally, a voltage regulator 155 is installed in the electronic driver 100 to provide one or more supply voltages ($V_{DD}$ and $V_{CC}$ as shown in FIG. 2) to power circuit elements and integrated circuits (ICs) at least in the converter circuit 120 and the electronic controller 140.

Advantageously, the electronic driver 100 may include an additional function of determining if the external voltage source 190 is the AC mains or if it is provided from a high-frequency electronic ballast. The ballast is usually installed with an electric-leakage protection circuit for compliance with a safety standard in the lighting industry. In the presence of the high-frequency electronic ballast, the electronic driver 100 may directly drive the LED load 195.

To determine the type of the external voltage source 190, the electronic driver 100 further comprises a frequency-measurement circuit 156 connected to input terminals 151a, 151b of the rectifier for measuring a frequency of a possible AC voltage of the external voltage source 190. The electronic controller 140 is further configured to obtain the measured frequency value. The control process executed by the electronic controller 140 further comprises a start-up subprocess performed at the start-up phase of the electronic driver 100. In the start-up subprocess, the electronic controller 140 obtains the measured frequency from the frequency-measurement circuit 156 and compares the measured frequency with a predetermined frequency value for determining whether the external voltage source 190 is a ballast-provided voltage source, namely, a voltage source provided by a ballast (step 210). This frequency value may be simply selected as one that is substantially higher than 50 Hz or 60 Hz, the grid frequency. For example, this frequency may be chosen as 120 Hz, 200 Hz, 500 Hz or 1 kHz. When the measured frequency value is greater than the predetermined frequency value, the start-up subprocess determines that the external voltage source 190 is, or is substituted by, the ballast-provided voltage source. Thereafter, the electronic controller 140 switches on the solid-state switch 132 so as to directly drive the LED load 195 without any need to execute the test subprocess (i.e. the electronic controller 140 directly jumping to the step 240). Otherwise, the start-up subprocess directs the electronic controller 140 to go back to a normal procedure of performing the test subprocess by initiating the step 220.

FIG. 4 provides example circuit realization of the converter circuit 120, the electronic controller 140, the current sensor 131, the solid-state switch 132, the voltage regulator 155 and the frequency-measurement circuit 156.

The current sensor 131 may be implemented as a resistor 341 as shown in FIG. 4. Hence, the current sensor 131 is implementable by including the resistor 341 such that a voltage developed across the resistor 341 is (or, more exactly, is proportional to) the measured return-current value.

The solid-state switch 132 may be implemented by including a MOSFET 331.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. An electronic driver for driving a light-emitting diode (LED) load comprising:
   a converter circuit for converting electrical power provided by a unipolar voltage source to an output current used for driving the LED load, the converter circuit including a local ground node for collecting the output current and an operating current drawn by the converter circuit to form a return current to be returned to the unipolar voltage source, the unipolar voltage source having a source-side ground node for receiving at least the return current;
   two electrical contacts collectively for electrically connecting to an external voltage source and receiving electrical power therefrom, the received electrical power being used for powering the unipolar voltage source;
   a series cascade of a current sensor and a solid-state switch, the series cascade connecting the source-side ground node and the local ground node such that the current sensor is used for measuring the return current; and
   an electronic controller configured to execute a control process for controlling the solid-state switch to switch on and off, the control process comprising a test subprocess for testing whether the external voltage source is electrically connected to both the electrical contacts, the test subprocess comprising:
      switching on the solid-state switch for a test duration so as to drive the converter circuit to operate during the test duration, wherein the test duration is selected to be not greater than a maximum test duration predetermined for avoiding a person to absorb from the external voltage source an energy greater than a pre-defined human-tolerable shock energy under a condition that the external voltage source is electrically connected to only one of the electrical contacts and the person accidentally touches another one of the electrical contacts;
      obtaining, from the current sensor, a measured value of the return current observed during the test duration; and
      determining whether the external voltage source is electrically connected to both the electrical contacts according to the measured return-current value;
   the control process further comprising:
      responsive to determining that the external voltage source is electrically connected to both the electrical contacts, switching on the solid-state switch so as to drive the LED load; and
      responsive to determining that the external voltage source is not electrically connected to both the electrical contacts, switching off the solid-state switch for an idle period so as to isolate the converter circuit from the unipolar voltage source, and then repeating the test subprocess, wherein the idle period is selected such that an energy absorbed by the converter circuit during the test period is substantially dissipated during the idle period.

2. The electronic driver of claim 1, wherein the solid-state switch comprises a MOSFET.

3. The electronic driver of claim 1, wherein the current sensor comprises a resistor, whereby a voltage developed across the resistor is the measured value of the return current obtained by the electronic controller.

4. The electronic driver of claim 1, wherein the maximum test duration is 50 μs.

5. The electronic driver of claim 1 further comprising:
   a rectifier for rectifying an AC voltage provided by the external voltage source to yield the unipolar voltage source.

6. The electronic driver of claim 5 further comprising:
a frequency-measurement circuit connected to a plurality of input terminals of the rectifier for measuring a frequency of the AC voltage;
wherein the control process further comprises:
obtaining, from the frequency-measurement circuit, a measured frequency value;
responsive to finding that the measured frequency value is greater than a predetermined frequency value, switching on the solid-state switch to drive the LED load without a need to execute the test subprocess; and
responsive to finding that the measured frequency value is not greater than the predetermined frequency value, initiating the test subprocess.

7. The electronic driver of claim 6, wherein the predetermined frequency value is 120 Hz.

8. A light-emitting diode (LED) lamp device comprising:
the LED load; and
the electronic driver of claim 1 for driving the LED load, wherein a predetermined current value is determined such that when the LED lamp device is tested for a possible risk of electric shock according to UL 1993, the LED lamp produces a meter reading defined in UL 935 to be not greater than 5 meter indicating units (M.I.U.).

9. The electronic driver of claim 1, wherein the determining of whether the external voltage source is electrically connected to both the electrical contacts comprises:
responsive to finding that the measured value of the return current has a magnitude greater than a predetermined current value, determining that the external voltage source is electrically connected to both the electrical contacts; and
responsive to finding that the magnitude is less than the predetermined current value, determining that the external voltage source is not electrically connected to both the electrical contacts.

10. The electronic driver of claim 9, wherein the solid-state switch comprises a MOSFET.

11. The electronic driver of claim 9, wherein the current sensor comprises a resistor, whereby a voltage developed across the resistor is the measured value of the return current obtained by the electronic controller.

12. The electronic driver of claim 9, wherein the maximum test duration is 50 μs.

13. The electronic driver of claim 9, wherein the idle period is not less than 10 ms.

14. The electronic driver of claim 9 further comprising:
a rectifier for rectifying an AC voltage provided by the external voltage source to yield the unipolar voltage source.

15. The electronic driver of claim 14 further comprising:
a frequency-measurement circuit connected to a plurality of input terminals of the rectifier for measuring a frequency of the AC voltage;
wherein the control process further comprises:
obtaining, from the frequency-measurement circuit, a measured frequency value;
responsive to finding that the measured frequency value is greater than a predetermined frequency value, switching on the solid-state switch to drive the LED load without a need to execute the test subprocess; and
responsive to finding that the measured frequency value is not greater than the predetermined frequency value, initiating the test subprocess.

16. The electronic driver of claim 15, wherein the predetermined frequency value is 120 Hz.

17. A light-emitting diode (LED) lamp device comprising:
the LED load; and
the electronic driver of claim 9 for driving the LED load, wherein the predetermined current value is determined such that when the LED lamp device is tested for a possible risk of electric shock according to UL 1993, the LED lamp produces a meter reading defined in UL 935 to be not greater than 5 meter indicating units (M.I.U.).

* * * * *